United States Patent
Iacobovici et al.

(10) Patent No.: US 6,704,876 B1
(45) Date of Patent: Mar. 9, 2004

(54) MICROPROCESSOR SPEED CONTROL MECHANISM USING POWER DISSIPATION ESTIMATION BASED ON THE INSTRUCTION DATA PATH

(75) Inventors: Sorin Iacobovici, San Jose, CA (US); Ronald Melanson, Woodside, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 556 days.

(21) Appl. No.: 09/669,346

(22) Filed: Sep. 26, 2000

(51) Int. Cl.[7] .................................................. G06F 1/26
(52) U.S. Cl. ........................ 713/300; 713/320; 713/322
(58) Field of Search ............................... 713/300, 320, 713/322

(56) References Cited

U.S. PATENT DOCUMENTS

| | | | |
|---|---|---|---|
| 5,532,935 A | * 7/1996 | Ninomiya et al. | 700/296 |
| 5,557,551 A | 9/1996 | Craft | |
| 6,081,901 A | 6/2000 | Dewa et al. | 713/300 |
| 6,085,330 A | 7/2000 | Hewitt et al. | 713/322 |
| 6,513,146 B1 | * 1/2003 | Yonezawa et al. | 716/7 |
| 6,564,328 B1 | * 5/2003 | Grochowski et al. | 713/320 |

FOREIGN PATENT DOCUMENTS

| | | | |
|---|---|---|---|
| EP | 0 901 061 A2 | 3/1999 | |
| JP | 04038124 A | * 2/1992 | H02J/3/00 |
| JP | 11332099 A | * 11/1999 | H02J/3/00 |
| WO | WO 01/48584 A1 | 7/2001 | |

OTHER PUBLICATIONS

"Quick VLSI CMOS Power Estimator". IBM Technical Disclosure Bulletin. Nov. 1990. vol. 33, Issue 6A. pp. 433–435.*

* cited by examiner

*Primary Examiner*—Thomas Lee
*Assistant Examiner*—Eric Chang
(74) *Attorney, Agent, or Firm*—Rosenthal & Osha L.L.P.

(57) ABSTRACT

A power dissipation control mechanism for a central processing unit includes a power estimation circuit for estimating the power dissipation of instructions executed by the central processing during a selected time interval and a speed controller for adjusting the speed of the central processing unit in response to the estimated power dissipation produced by the power estimation circuit.

13 Claims, 4 Drawing Sheets

MICROPROCESSOR SPEED CONTROL MECHANISM USING POWER DISSIPATION ESTIMATION BASED ON THE INSTRUCTION DATA PATH

BACKGROUND OF THE INVENTION

1. Field of the Invention

The invention relates generally to power management in computer systems. More specifically, the invention relates to a method and apparatus for dynamically controlling the processing speed of a central processing unit (CPU).

2. Background Art

Recent advances in semiconductor technology have led to the development of high-performance CPUs. These high-performance CPUs operate at high frequencies and usually have high power dissipation. In general, the power dissipated, or consumed, by a CPU is related to the number of instructions the CPU executes per clock cycle. The higher the number of instructions executed per clock cycle, the higher the power consumed by the CPU. In addition, the higher the amount of power consumed by the CPU, the higher the heat dissipated by the CPU. To prevent excessive rise in the temperature of the CPU, the power consumption of the CPU is usually controlled. Traditional techniques prevent excessive rise in the temperature of the CPU by decreasing the CPU clock rate when the CPU stops significant processing or is waiting for an event to take place. Another technique for preventing excessive rise in the temperature of the CPU involves using sensors to monitor the temperature of the CPU and then decreasing the CPU clock rate when the temperature reaches or exceeds a predetermined threshold. U.S. Pat. No. 6,081,901 issued to Dewa et al. describes a power control system that allows a user to accelerate or decelerate a CPU's processing speed through an interface such as a hot key or a button on a display screen.

SUMMARY OF THE INVENTION

In one aspect, the invention relates to a power dissipation control mechanism for a CPU which comprises a power estimation circuit and a speed controller. The power estimation circuit estimates the power dissipation of instructions executed by the CPU during a selected time interval, and the speed controller adjusts the speed of the CPU in response to the estimated power dissipation produced by the power estimation circuit.

In another aspect, the invention relates to a method for controlling the power dissipation of a CPU. The method comprises estimating the power dissipation of instructions executed by the CPU during a selected time interval. During normal operation of the CPU, the method further includes checking to see if the estimated power dissipation is greater than a first predetermined value. If the estimated power dissipation is greater than the first predetermined value, the method further includes reducing the speed of the CPU. The speed can be adjusted either by decreasing the CPU clock rate or by stalling the CPU. While the CPU is operating at reduced speed, the method further includes checking to see if the estimated power dissipation is smaller than a second predetermined value. If the estimated power dissipation is smaller than the second predetermined value, the method further includes increasing the speed of the CPU.

In another aspect, the invention relates to a microprocessor which comprises a CPU, a power estimation circuit, and a speed controller. The power estimation circuit estimates the power dissipation of instructions executed by the CPU during a selected time interval, and the speed controller adjusts the speed of the CPU in response to the estimated power dissipation produced by the power estimation circuit.

Other aspects and advantages of the invention will be apparent from the following description and the appended claims.

DETAILED DESCRIPTION OF THE INVENTION

Embodiments of the invention provide a mechanism for dynamically controlling power dissipation of a CPU. In general, the power dissipation control mechanism uses two registers, herein referred to as power high water mark (PHWM) register and power low water mark (PLWM) register, to set the power dissipation range of the CPU. The mechanism estimates the power dissipation of the CPU during a given time interval and compares the estimated power dissipation to the values stored in the PHWM and PLWM registers. If the estimated power dissipation is higher than the value in the PHWM register, the CPU is slowed down or stalled. If the CPU is operating at reduced speed and the estimated power dissipation is lower than the PLWM register, the CPU is returned to full speed. The PHWM and PLWM registers may be set by privileged software during boot-up of the computer system. This is advantageous because different power dissipation ranges can be set for the same CPU, thus allowing the CPU to be used in a broad range of applications, ranging from servers, which require high performance and can withstand higher power dissipation, to battery-operated devices, e.g., notebook computer and personal digital assistant, where power dissipation is a main concern.

Figure 1:
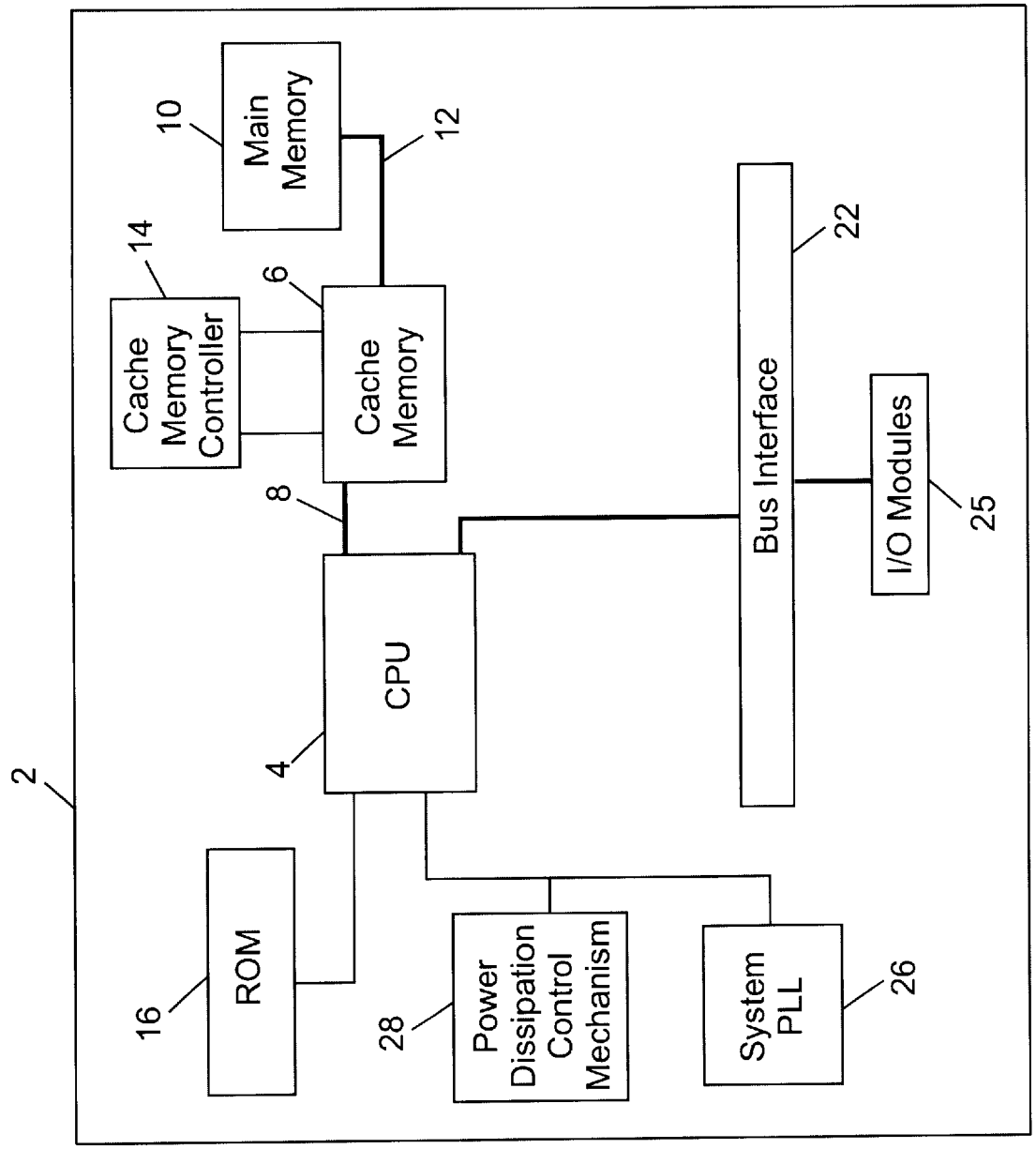
FIG. 1 shows a block diagram of a computer system in accordance with one embodiment of the invention.

Various embodiments of the invention will now be described with reference to the accompanying figures. FIG. 1 shows a block diagram of a computer system 2 which is driven by a CPU 4. The CPU 4 is connected to a cache memory 6 by a bus 8. The cache memory 6 is connected to main memory 10 by a bus 12. Every request from the CPU 4 to the main memory 10 is first seen by a cache memory controller 14, which is operatively coupled to the cache memory 6. Upon receiving a request from the CPU 4, the cache memory controller 14 checks the cache memory 6 to determine whether the memory location stored in the CPU request is presently stored within the cache memory 6. If the memory location is stored within the cache memory 6, i.e., a "hit," the cache memory 6 is used as if it were the main memory 10. For example, if the CPU request is a read instruction, the cache memory 6 provides the requested information, or if the CPU request is a write instruction, the data is written into the cache memory 6. If the memory location in the CPU request is not stored within the cache memory 6, i.e., a "miss" a cache-block-sized block of memory that includes the required location is copied from the main memory 10 to the cache memory 6.

During operation, the cache memory 6 may get full. If the cache memory 6 gets full, one or more blocks in the cache memory 6 may be selected for replacement, typically using some variation of a least recently used (LRU) replacement algorithm. Typically, the cache memory 6 is included within the same integrated circuit as the CPU 4. Additional levels of cache memory may also be provided to further enhance the system. When there are multiple levels of caches, the CPU request is first passed to the cache memory closest to the CPU 4. If there is a hit, the cache memory closest to the CPU 4 is used as if it were the main memory 10. If there is a miss, the CPU request is transferred to the next cache memory. The process continues until there is a hit. If the memory location stored in the CPU request is not available in any of the caches, the required location is copied from the main memory 10 into the cache memory most advantageous from the performance point of view.

In the illustrated computer system 2, the CPU 4 is connected to a read-only memory (ROM) 16. The ROM 16 stores data that is not likely to change throughout the life of the computer system 2. The computer system 2 further includes a system phase-locked loop (PLL) 26. The system PLL 26 functions as a system-wide clock generator that supplies the timing signals to the entire computer system 2. In the invention, the computer system 2 further includes a power dissipation control mechanism 28. The power dissipation control mechanism 28 stalls the CPU 4 or alters the timing signals supplied by the system PLL 26 so that the processing speed of the CPU 4 can be increased or decreased. The power dissipation control mechanism 28 is described in detail below. In practice, the power dissipation control mechanism 28 would be included on the same chip as the CPU 4.

Figure 2:
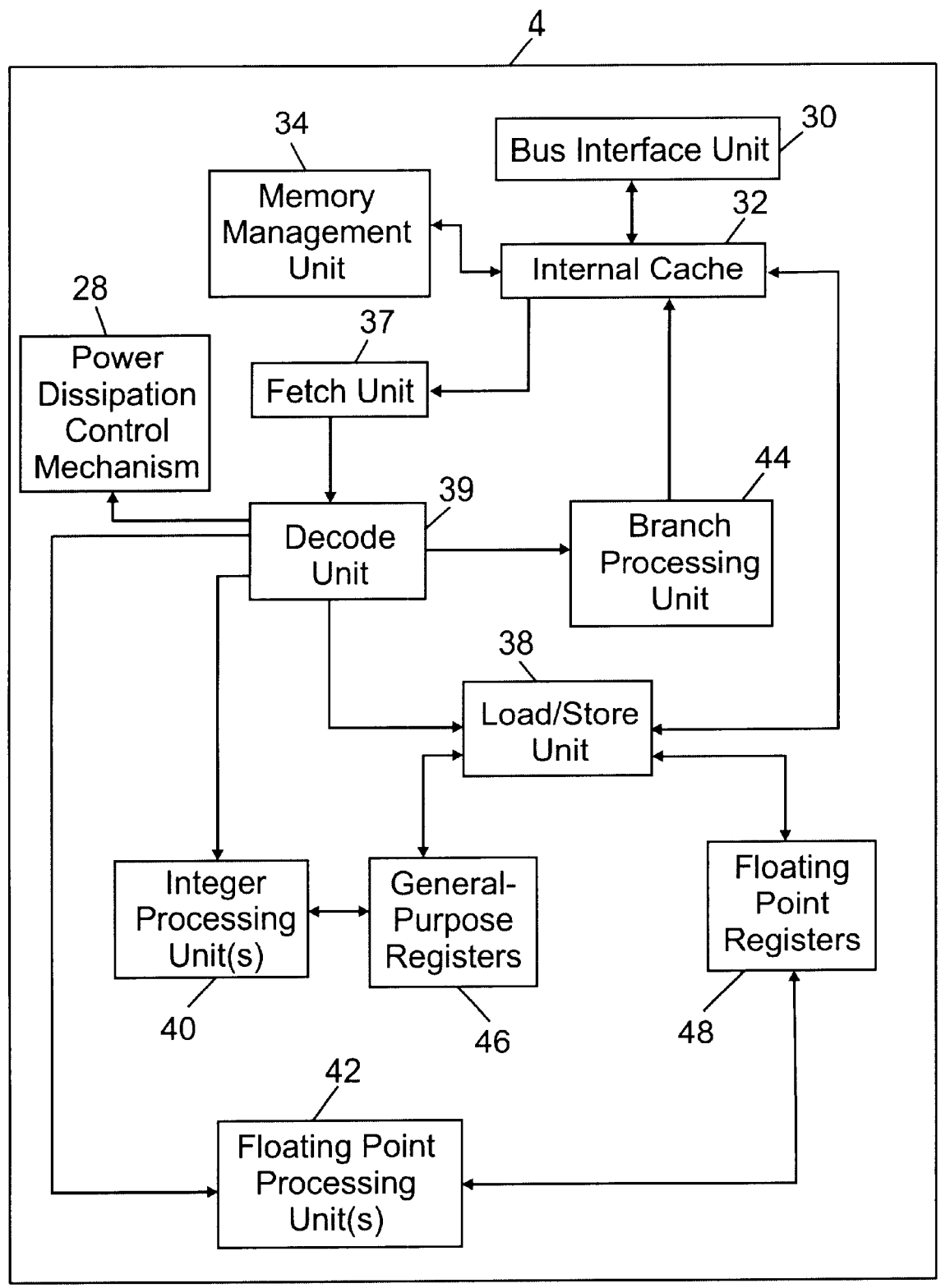
FIG. 2 shows a block diagram of one embodiment of the CPU shown in FIG. 1.

Various types of CPU architectures are known in the art. See, for example, Irv Englander, "The Architecture of Computer Hardware and Systems Software: An Information Technology Approach," John Wiley & Sons, Inc., 2000. FIG. 2 shows a block diagram of one embodiment of the CPU 4 (previously shown in FIG. 1). As illustrated in FIG. 2, the CPU 4 includes a bus interface unit 30 which provides the logic and memory registers necessary to address the rest of the system. The CPU 4 further includes an internal cache 32 and a memory management unit 34. The memory management unit 34 translates virtual addresses to physical addresses that can be used to access the cache memory and main memory 10 (shown in FIG. 1). The CPU 4 further includes a fetch unit 37 and a decode unit 39. The fetch unit 37 fetches instructions from the internal cache 32 based on the current address stored in an instruction pointer register (not shown). The decode unit 39 partially decodes the instructions fetched by the fetch unit 37 to determine the type of instruction that is being executed. The decode unit 39 also provides the input which is used by the power dissipation control mechanism 28 to estimate the power dissipation of the CPU 4, as will be further explained below. The fetch unit 37 may be pipeline-based, i.e., may include one or more pipelines so as to allow multiple fetches to be simultaneously processed.

The decode unit 39 dispatches instructions to execution units, e.g., the load/store unit 38, the integer processing unit 40, the floating point unit 42, or the branch processing unit 44. Each of the execution units includes a pipeline which is designed to optimize the execution cycle for a particular type of instruction. For example, the load/store unit 38, the integer processing unit 40, the floating point unit 42, and the branch processing unit 44 each have a pipeline which is designed to optimize the execution cycle for load and store instructions, integer instructions, floating instructions, and branch processing instructions, respectively. The system PLL 26 (shown in FIG. 1) controls when each step in the instruction cycle takes place. The CPU 4 includes general purpose registers 46 and floating point registers 48 which can be used to hold data.

Figure 3:
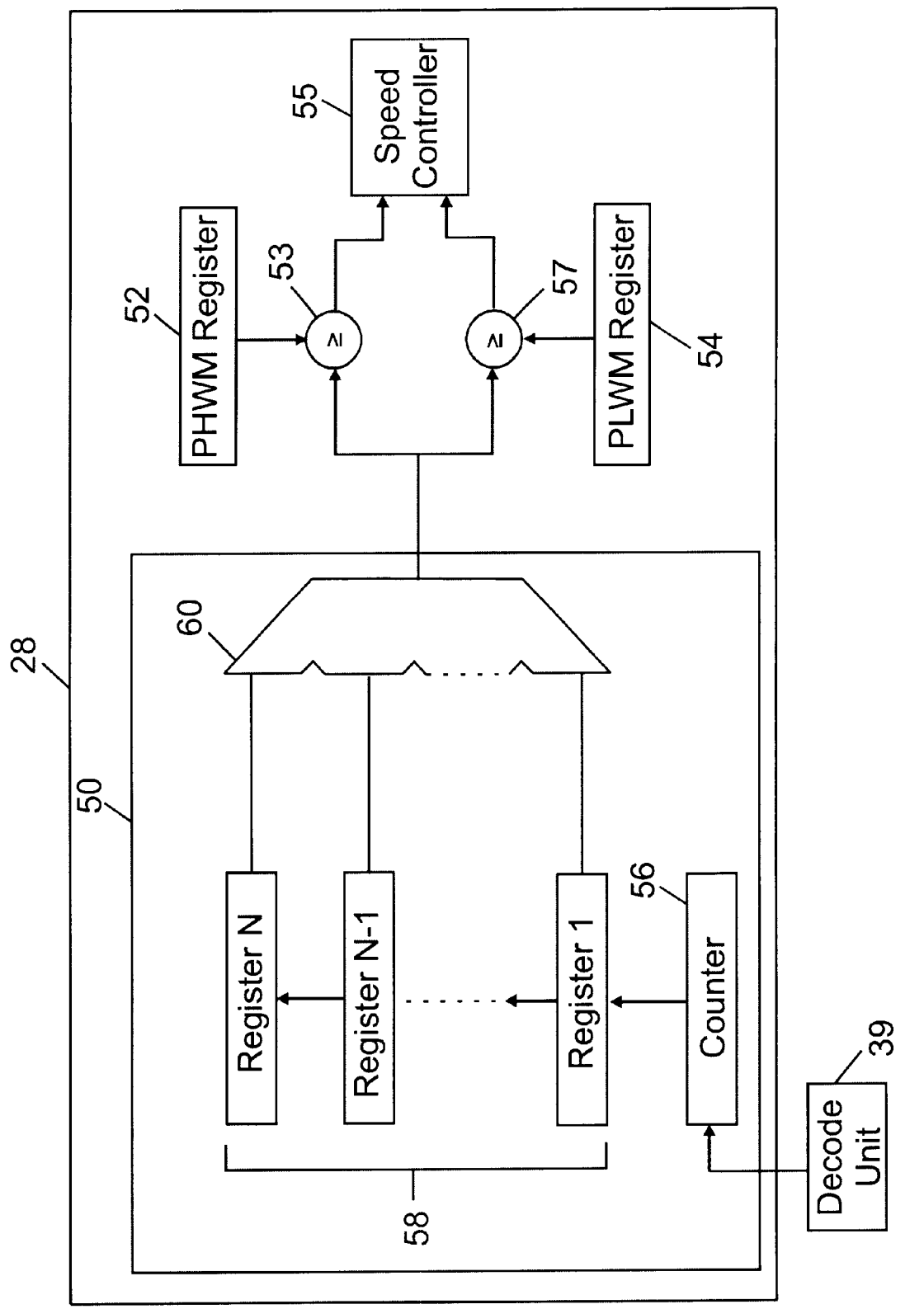
FIG. 3 shows a block diagram of a power dissipation control mechanism in accordance with one embodiment of the invention.

FIG. 3 shows a block diagram of the power dissipation control mechanism 28 (previously shown in FIGS. 1 and 2) according to one embodiment of the invention. The power dissipation control mechanism 28 includes a power estimation circuit 50. The power estimation circuit 50 estimates the power dissipation of the CPU 4 in a selected time interval, e.g., 2 seconds. During normal (full speed) operation of the CPU 4, the estimated power dissipation of the CPU 4 produced by the power estimation circuit 50 is compared with the value of the PHWM register 52, as shown at comparator 53. If the estimated power dissipation of the CPU 4 is greater than the value of the PHWM register 52, a speed controller 55 issues an instruction to slow down or stall the CPU 4. The CPU 4 can be slowed down, for example, by forcing the system PLL 26 (shown in FIG. 1) to lock on half-frequency. Alternatively, the CPU 4 can be stalled, for example, by forcing the CPU 4 to stop issuing or committing instructions. While the CPU 4 is in this sloweddown or stalled state, the estimated power dissipation of the CPU 4 produced by the power estimation circuit 50 is compared with the value of the PLWM register 54, as shown at comparator 57. When the estimated power dissipation produced by the power estimation circuit 50 becomes smaller than the value of the PLWM register 54, the CPU 4 is allowed to return to full speed again, e.g., by locking the system PLL 26 (shown in FIG. 1) back at full frequency or by removing the CPU 4 stall. The PHWM register 52 and the PLWM register 54 are set by privileged software. This privileged software could be loaded in the ROM 16, for example, and could be run during boot-up of the computer system 2 (shown in FIG. 1).

The power estimation circuit 50 includes a counter 56, a shift register 58, and an adder 60. The value of the counter 56 is incremented by a number that is proportional with the power dissipation of the instruction that is currently being executed by the CPU 4. The power dissipation of an instruction is a function of the data paths used by the instruction, i.e., the number of steps required to execute the instruction. The counter 56 is incremented with a value in a certain range, e.g., 1 to 15, provided by the decoder unit 39 (shown in FIG. 2) as a function of the decoder instruction. In the case of an internal cache 32 (shown in FIG. 2) miss, the cache memory 6 (shown in FIG. 1) or other higher-level caches (not shown) could increment the counter 56, if integrated on the same chip as the CPU 4. Alternatively, the bus interface unit 30 (shown in FIG. 2) could increment the counter 56 if in use (usually where there is a miss in all on-chip caches).

At the end of a fixed time period, the value of the counter 56 is loaded in the shift register 58. The shift register 58 is made of N registers. The counter 56 is loaded into the first register, i.e., register 1. This effectively shifts the contents of the other registers 2 through N and discards the oldest value in the register N. The fixed time period after which the counter is loaded in the shift register 58 is based on the number of registers in the shift register 58 and the selected time interval for estimating the power dissipation of the CPU 4. Thus, for example, if the shift register 58 has 8 registers and the selected time interval for estimating the power dissipation of the CPU 4 is 2 seconds, then the fixed time period after which the counter 56 will be loaded into the shift register 58 would be ⅔ (or 0.25) seconds. In general, the shift register 58 should a sufficient number of registers to hold entries for the selected time interval. The counter 56 is cleared after its contents are loaded in the shift register 58. The counter 56 then starts counting the power dissipation for the next time period. The adder 60 sums up the value of all the registers of the shift register 58. The output of the adder 60 is the power estimate that is compared to the values of the PHWM register 52 and PLWM register 54.

Figure 4:
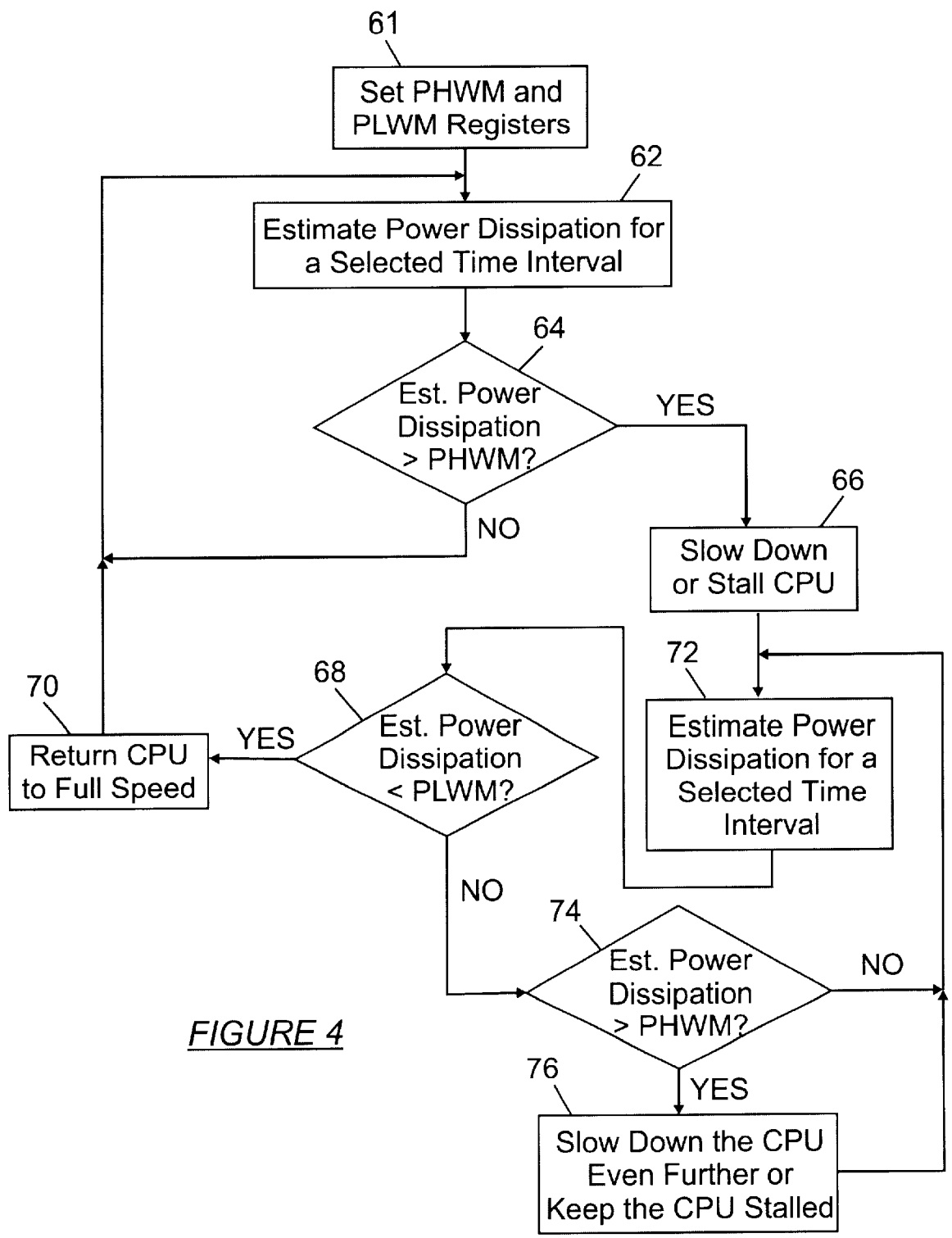
FIG. 4 is flow chart which summarizes a method for controlling power dissipation of a CPU in accordance with one embodiment of the invention.

FIG. 4 summarizes the method for dynamically controlling the power dissipation of the CPU 4. At the beginning, as shown at 61, the values of the PHWM register 52 and PLWM register 54 (shown in FIG. 3) are set. As previously mentioned, these values could be set during boot-up of the computer system 2 using privileged software. The PHWM register 52 and PLWM register 54 (shown in FIG. 3) are set by privileged software to ensure that user application programs running on the computer system 2 do not accidentally change the values of the PHWM register 52 and the PLWM register 54 (shown in FIG. 3). The privileged software could be stored in the ROM 16 (shown in FIG. 1) or in some other storage.

During normal operation of the computer system 2 (shown in FIG. 1), the power estimation circuit 50 (shown in FIG. 3) estimates the power dissipation of the CPU 4 (shown in FIGS. 1 and 2) during a selected time interval, as shown at 62. The estimated power dissipation is then compared to the value of the PHWM register 52 (shown in FIG. 3), as shown at 64. If the estimated power dissipation is greater than the value of the PHWM register 52 (shown in FIG. 3), the CPU 4 is slowed down or stalled, as shown at 66. While the CPU 4 is slowed down or stalled, the power dissipation of the CPU 4 is continuously estimated, as shown at 72, and compared to the value of the PLWM register 54 (shown in FIG. 3), as shown at 68. When the estimated power dissipation becomes smaller than the value of the PLWM register 54, the CPU 4 is returned to full speed or the stall on the CPU 4 is removed. At step 68, if the estimated power dissipation is greater than the value of the PLWM register 54, the estimated power dissipation is compared to the value of the PHWM register 52, as shown at 74. If the estimated power dissipation is still greater than the value of the PHWM register 52, the speed of the CPU 4 is reduced even further, that is, assuming that the CPU 4 has not already been stalled, or the CPU 4 is stalled or maintained in the stalled condition, as shown at 76. The power dissipation of the CPU 4 is estimated continuously during operation and compared to the values of the PHWM register 52 and the PLWM register 54 to determine if the CPU 4 can operate at full speed or should be slowed down or stalled. In this way, the power dissipation of the CPU 4 is maintained within the predetermined range set by the PHWM register 52 and the PLWM register 54.

The invention has been described for a computer driven by one CPU. However, it should be clear the power dissipation control mechanism described herein could also be used in a computer driven by multiple CPUs. Each CPU would have an associated power dissipation control mechanism. The invention provides advantages in that it allows a power dissipation range to be set for a CPU and dynamically controls the speed of the CPU so that the desired power dissipation level is maintained for the CPU. With the invention, there is no need for a sensor to monitor the temperature of the CPU because the power dissipation control mechanism effectively maintains the power dissipation range of the CPU within the acceptable range. The power dissipation range can be set based on the application in which the CPU is used. This makes it possible to use the same CPU for a broad range of applications.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A power dissipation control mechanism for a central processing unit, comprising:
    a power estimation circuit for estimating the power dissipation of an instructions executed by the central processing unit during a selected time interval; and
    a speed controller for adjusting the speed of the central processing unit in response to the estimated power dissipation produced by the power estimation circuit,
    wherein the power estimation circuit comprises a counter incrementing as a function of a data path used by the instruction, and
    wherein the power estimation circuit further comprises a shift register having a plurality of registers for storing an output of the counter.

2. The power dissipation control mechanism of claim 1, wherein the power estimation circuit further includes an adder which sums up the values of the registers of the shift register to obtain the estimated power dissipation.

3. A method for controlling the power dissipation of a central processing unit, comprising:
    incrementing a counter as a function of a data path used by an instruction;
    estimating the power dissipation of the instructions executed by the central processing unit from the value of the counter during a selected time interval wherein estimating the power dissipation from the value of the counter comprises loading an output of the counter into a shift register after a fixed time period; and
    reducing the speed of the central processing unit if the estimated power dissipation is greater than a first predetermined value.

4. The method of claim 3, wherein the fixed time period is equal to the selected time interval divided by the number of registers in the shift register.

5. The method of claim 3, wherein estimating the power dissipation from the value of the counter includes summing the values of the registers after the selected time interval, and
    wherein the power estimation circuit further comprises a shift register having a plurality of registers for storing an output of the counter.

6. The method of claim 3, wherein reducing the speed of the central processing unit comprises reducing the clock frequency supplied to the central processing unit.

7. The method of claim 6, wherein the speed of the central processing unit is reduced until the estimated power dissipation is smaller than the second predetermined value.

8. The method of claim 6, wherein increasing the speed of the central processing unit includes increasing the clock frequency supplied to the central processing unit such that the central processing unit operates at full speed.

9. The method of claim 3, wherein reducing the speed of the central processing unit comprises placing the central processing unit in a stall condition.

10. The method of claim 9, wherein increasing the speed of the central processing unit includes removing the stall condition on the central processing unit.

11. A microprocessor, comprising:
    a central processing unit;
    a power estimation circuit for estimating the power dissipation of an instructions executed by the central processing unit during a selected time interval; and
    a speed controller for adjusting the speed of the central processing unit in response to the estimated power dissipation produced by the power estimation circuit,
    wherein the power estimation circuit comprises a counter incrementing as a function of a data path used by the instruction.

12. The microprocessor of claim 11, wherein the counter is configured to receive input indicative of the data paths of the instructions from a decoding unit in the central processing unit.

13. The microprocessor of claim 11, wherein the power estimation circuit further includes an adder which sums up the values of the registers to obtain the estimated power dissipation.

* * * * *

UNITED STATES PATENT AND TRADEMARK OFFICE
CERTIFICATE OF CORRECTION

PATENT NO. : 6,704,876 B1 Page 1 of 1
DATED : March 9, 2004
INVENTOR(S) : Sorin Iacobovici et al.

It is certified that error appears in the above-identified patent and that said Letters Patent is hereby corrected as shown below:

Column 6,
Lines 29-32, please delete the phrase ", and wherein the power estimation circuit further comprises a shift register having a plurality of registers for storing an output of the counter".
Line 51, replace "instructions" with -- instruction --;
Line 57, insert -- , and wherein the power estimation circuit further comprises a shift register having a plurality of registers for storing an output of the counter --.
Line 59, replace "paths" with -- path --;
Line 60, replace "instructions" with -- instruction --.

Signed and Sealed this

Eighteenth Day of May, 2004

JON W. DUDAS
*Acting Director of the United States Patent and Trademark Office*